US008308197B2

(12) United States Patent
Peters et al.

(10) Patent No.: US 8,308,197 B2
(45) Date of Patent: Nov. 13, 2012

(54) DIFFRACTIVE SECURITY ELEMENT WITH INDIVIDUALIZED CODE

(75) Inventors: John Anthony Peters, Au (CH); Wayne Robert Tompkin, Baden (CH); Andreas Schilling, Hagendorn (CH)

(73) Assignee: OVD Kinegram AG, Zug (CH)

( * ) Notice: Subject to any disclaimer, the term of this patent is extended or adjusted under 35 U.S.C. 154(b) by 980 days.

(21) Appl. No.: 12/207,066

(22) Filed: Sep. 9, 2008

(65) Prior Publication Data

US 2009/0072526 A1 Mar. 19, 2009

(30) Foreign Application Priority Data

Sep. 19, 2007 (DE) ......................... 10 2007 044 992

(51) Int. Cl.
*B42D 15/00* (2006.01)
*B42D 15/10* (2006.01)
*G09C 3/00* (2006.01)

(52) U.S. Cl. ................ 283/91; 283/67; 283/70; 283/72; 283/74; 283/75; 283/86; 283/88; 283/94; 283/901

(58) Field of Classification Search .................... 283/67, 283/70, 72, 74, 75, 88, 89, 91, 94, 117, 901, 283/86
See application file for complete search history.

(56) References Cited

U.S. PATENT DOCUMENTS

| | | | | |
|---|---|---|---|---|
| 3,973,852 | A * | 8/1976 | Moore et al. | 356/438 |
| 5,331,443 | A | 7/1994 | Stanisci | |
| 5,505,494 | A * | 4/1996 | Belluci et al. | 283/75 |
| 5,886,798 | A * | 3/1999 | Staub et al. | 283/86 |
| 2008/0055880 | A1* | 3/2008 | Williams et al. | 362/11 |
| 2008/0094713 | A1* | 4/2008 | Tompkin et al. | 359/576 |
| 2008/0106090 | A1* | 5/2008 | Pustel et al. | 283/75 |
| 2008/0252064 | A1* | 10/2008 | Sekine et al. | 283/91 |

FOREIGN PATENT DOCUMENTS

| | | | |
|---|---|---|---|
| FR | 2908223 | A1 * | 5/2008 |
| JP | 2008225727 | * | 3/2007 |
| WO | WO9300224 | | 1/1993 |

* cited by examiner

*Primary Examiner* — Dana Ross
*Assistant Examiner* — Justin V Lewis
(74) *Attorney, Agent, or Firm* — Hoffman & Baron, LLP

(57) ABSTRACT

Described is a security element for increasing the forgery-proof nature of a security document, in particular an identity card or pass, a passport or an identification card. The security element (1) has a first diffractive region (15) having an open code which is visible with a naked eye. The first diffractive region further has a concealed code which is not visible with the naked eye and which can be reconstructed from the arrangement of diffractive microregions disposed in the first region (1) and/or from the structure of the first diffractive region (1). Further described is a method of increasing the forgery-proof nature of a security document.

15 Claims, 7 Drawing Sheets

DIFFRACTIVE SECURITY ELEMENT WITH INDIVIDUALIZED CODE

BACKGROUND OF THE INVENTION

The invention concerns a security element and a method of verifying a security element.

Diffractive security elements are used to enhance the forgery-proof nature of a security document, in particular an identity card, a passport or an identification card or a product. The security elements have different security features which depending on the respective configuration involved permit a safeguard against copying or forgery, and checking with or without auxiliary aids, and provide items of information which can be used for verification of the security element or for automatic identification of a person.

SUMMARY OF THE INVENTION

The object of the present invention is to provide an improved security element which is inexpensive to produce and forgery-proof, and a method of verifying a security element.

In accordance with the invention that object is attained by a security element for increasing the forgery-proof nature of a security document, in particular an identity card, a passport or an identification card, or a product, wherein it is provided that the security element has a first region in which there is shaped at least region-wise in a layer of the security element a diffractive surface relief which is provided at least region-wise with a reflection layer and which shows an open item of information visible with a naked eye and the first region further has a concealed code which is not visible with the naked eye and which can be read out optically and which is machine-readable and which is formed from an arrangement of microregions which are arranged in the first region and which differ optically from the surrounding region and in which a surface relief differing from the surrounding region is shaped and/or the reflection layer is removed and/or the machine-readable code is generated by the surface relief which is shaped into the layer.

In addition the object is attained by a method of increasing the forgery-proof nature of a security document, in particular an identity card, a passport or an identification card, wherein it is provided that a security element is provided which has a first region in which there is shaped at least region-wise into a layer of the security element a diffractive surface relief which is provided at least region-wise with a reflection layer and which shows an open item of information which is visible with a naked eye, wherein the first region further has a concealed code which is not visible with the naked eye and which can be optically read out and which is machine-readable and which is formed from an arrangement of microregions which are arranged in the first region and which differ optically from the surrounding region and in which a surface relief differing from the surrounding region is shaped and/or the reflection layer is removed and/or the machine-readable code is generated by the surface relief which is shaped into the layer, and the concealed machine-readable code is read out with a reading device for verification of the security element.

The viewer thus perceives in the first region the open item of information but the machine-readable code which is encoded in the same region remains concealed to the viewer.

The security element according to the invention is distinguished in that the concealed code is integrated into the diffractive surface structure of the security element. The concealed code can be copied only if the surface structure of the security element is shaped. That however is already to be prevented by a protective layer which covers the diffractive surface and which closes off mechanical access to the diffractive surface. Furthermore any attempt to alter the optical appearance of the open item of information or the concealed code has an influence on the concealed code or the open item of information respectively so that such attempts at manipulation can be easily detected.

Furthermore the code introduced is also resistant in long-term use because it is not represented by a substance which can be removed by wear and tear such as a printing ink or the like. Further advantages are afforded in the manufacturing process which does not require any additional working steps.

It is further advantageous for the concealed code to be integrated into the first region in such a way that it is not revealed even when using optical magnifying aids such as a magnifying glass or a microscope.

The method according to the invention provides a concealed machine-readable code which is read out by means of a reading device. That provides the prerequisites for effecting verification of the security element automatically and with a high degree of reliability.

Further advantageous configurations are set forth in the appendant claims.

It can be provided that the open item of information which is visible with a naked eye is an open, optically machine-readable code.

It can further be provided that the open code and/or the concealed code is or are formed from alphanumeric characters and/or from a barcode. The barcode can advantageously be provided for simplifying mechanical examination of the open code. The code represented by alphanumeric characters can be provided for example for inputting it manually into a database for the inspection operation or for reading out unencrypted clear data such as an expiry date.

An advantageous configuration provides that the open and/or concealed code is or are an individualized code. The individualized code can contain for example product-specific data, in which respect it is possible to allocate a specific code for each product item.

The open individualized code which can be introduced with a laser is preferably implemented in the form of an alphanumeric code, a barcode or a combination of alphanumeric code and barcode. The alphanumeric code preferably has fewer than 20 characters while a barcode (in particular a 2D barcode) can contain substantially more information. In that respect the alphanumeric code can include a part of the amount of information represented by the barcode. By way of example the alphanumeric code can be a serial or a document number. If the barcode contains the serial number of a product, the barcode can further include for example the product name, information relating to the manufacturer, expiry or best-before date, country of origin or country of sale, as additional items of information. If the barcode includes a document number, it can further include for example the name of the country, the date of issue, the expiry date, the name of the owner or the date of birth, as additional items of information.

As described hereinafter input of the individualized code can be effected during or after manufacture of the security element, that is to say it can also be effected by the manufacturer of the product or upon distribution of the product. Equally security documents can be provided with individualized codes, for example passports, driver's licenses or identification cards. In that way the path from the manufacturer to the consumer can be followed for example in relation to products.

In a similar manner the machine-readable code can include in the first region (background region) an item of information which however is not an item of information that is individualized in relation to the respective security element. That item of information is the same for all produced security elements or for a group of produced security elements. This can be a simple logo but it can also involve a simple picture or image giving important items of information about the category or the product. For example it can be a corporate logo which is combined with the letter "F" if the product is sold in France and which is combined for example with the letter "B" if the product is sold in Brazil. The above-mentioned information which is concealed in the first region can however also serve to distinguish classes of documents from each other, for example by the national emblem of a country being combined with the letter "P" for a passport or with the letter "V" for a visa.

Preferably the microregions are arranged distributed over the first region in such a way that the mean surface area coverage by the microregion in the first region is constant in relation to a surface area region which is below the resolution capability of the human eye and in particular is constant in relation to a surface area region of 300 μm×300 μm. The microregions thus do not in any way influence the optical appearance of the open information and become submerged in noise.

It is further preferred if the microregions are of a surface area extent in the range of between 10 μm×10 μm and 30 μm×30 μm. The size details do not restrict the microregions involving square microregions. Rather, the microregions can be of any desired configuration, for example they can also be circular, elliptical, rhombic or rectangular. The square microregion can be preferred because it completely fills up the size range.

In addition a microregion which is of a dimension of less than 300 μm only in one direction but which is of a dimension of greater than 300 μm in the other direction, for example a dimension of some millimeters, cannot be separately perceived by the naked eye. It is therefore also possible for the microregions to be arranged in a raster grid, the grid width of which in a first direction is less than or equal to 300 μm and in a second direction more than 1 mm. That grid may also be a geometrically transformed grid. A plurality of regions which are defined by such a grid are referred to as microregions and thus form the arrangement of the microregions.

It can advantageously be provided that the microregions are covered with a reflection layer. That can provide a particularly high contrast in relation to the surrounding region. In that case in principle the microregions can have surface reliefs, as are provided for the first region, insofar as they differ in at least one parameter from the surface relief of the first region. It is possible for the microregions to have a grating structure which diffracts incident light into a preferred direction, only diffracts a given spectral range into a preferred direction, linearly polarizes the incident light or changes the polarization thereof, or for them to have a structure which acts as a retroreflector and deflects the reflected light in the direction of the incident light. In addition it is also possible for the reflection layer in the microregions to be partially removed by means of a laser whereby an optical difference is achieved in relation to the surrounding region.

In that case the concealed code is determined by the arrangement of the microregions in the first region. After detection of the arrangement, a predefined transformation function is used to project the arrangement onto the associated code value.

It can further be provided that there are not more than between 100 and 1000 microregions/mm$^2$ in the first region. In dependence on the size of the microregions, for example with a size measuring 30 μm×30 μm, the density in relation to surface area can be 250 microregions/mm$^2$ while with a size measuring 10 μm×10 μm the density in relation to surface area can be 1000 microregions/mm$^2$. With an excessively high density of the microregions in relation to surface area the optical appearance of the open information could be falsified although the individual microregions are not visible with the naked human eye and the concealed code remains concealed.

A further advantageous embodiment provides that a hologram is shaped into the layer in the first region in the form of a surface relief, showing the concealed machine-readable code only upon irradiation with monochromatic coherent light of a predefined wavelength.

Although the complication and expenditure for the production of (computer-generated) holograms and for conversion of the hologram into a surface relief is comparatively high, a hologram nonetheless affords the advantage that flaws do not ruin the stored information but only lead to a lesser resolution of the representation of the image. The hologram can be either a classic Fourier hologram or a computer-generated hologram (kinoform). It can also be advantageous for the operation of reading out the information to be possible only by means of a coherent monochromatic light beam as is provided by lasers. The laser beam must also be of a predefined light wavelength to permit efficient image production.

Further advantageous configurations are directed to the configuration of the surface relief of the first region.

It can be provided that a unitary diffractive structure is shaped as the surface relief into the layer in the first region.

It can further be provided that two or more diffractive structures are shaped as the surface relief into the layer in the first region, the diffractive structures being arranged in the form of a one-dimensional or two-dimensional pattern. The diffractive structures can differ for example in respect of their polarization properties and/or grating period and/or grating orientation and/or grating form and/or grating depth and/or grating profile form. The optically variable impression that they present upon illumination with the polychromatic light correspondingly differs.

It is further possible for a diffractive structure as the surface relief to be shaped into the layer in the first region, the diffractive structure having at least one continuously varying parameter. By way of example the gray value which occurs upon illumination with polychromatic light can continuously increase or decrease. In that respect it is possible for the continuous change to be produced by a one-dimensional pattern of sufficiently many different diffractive structures, in which respect the level of resolution can be so high that a naked human eye does not perceive a stepwise change but a continuous change.

The open item of information which is visible with a naked eye can be an open, optically machine-readable code.

It can advantageously be provided that the reflection layer is in the form of a metallic layer. The metallic layer exhibits a good reflection characteristic. It can however also be provided that high-refraction layers (HRI layers) are used. At the interfaces the high-refraction layer can adjoin air or a low-refraction layer. Preferably the surface relief is covered with an adhesive layer by means of which the security element is applied to a substrate.

It can be provided that the thickness of the reflection layer is in the range of between 10 mm and 100 mm. Depending on the thickness of the layer and the material of the reflection layer the layer can be semi-transparent or transparent. The diffractive surface relief is preferably shaped into a replication layer which can be a thermoplastic film or a UV hardening lacquer layer.

It can be provided that the open code is introduced into the first region by a laser engraving operation by the reflection layer being removed in the region of the code. Preferably laser engraving is used for partial removal of the reflection layer. The contrast of the code can be increased if a color layer, for example a layer containing black dye pigments, is arranged under the replication layer.

It can be provided that the open code and/or the concealed code is or are an individualized code.

It is possible for the concealed code to provide an item of information for verification of the security element. In that respect it can be provided that that information is encrypted, in which case a preferred encryption method is an asymmetrical encryption method in which a pair of keys comprising a public key and a private key is used. In that way it is possible for the concealed code to be generated by means of the private key upon individualization of the security element and for the public key to be subsequently used for verifying or reading out the information. In addition it is also possible for the concealed code and the open code to be interlinked for verifying or reading out the information, for example the open code/concealed code can represent a public key for decryption of the concealed or open code respectively.

It can further be provided that the security element has a second region in which the security element is in the form of an optically variable element (OVD).

It can further be provided that instead of or in addition to the first region the second region has an open machine-readable code which is visible with the naked eye. An OVD can further enhance the forgery-proof nature and can provide security features which can be easily checked and which are easily remembered. By way of example the OVD, upon being tilted, can present two or more different images, for example the script "OK" in a different position and/or color and/or size.

A further advantageous configuration provides that provided in the second region is a metallic reflection layer which is shaped in the form of an RFID antenna and forms the reflection layer of the OVD. Radio frequency identification can also be implemented without an RFID chip by the RFID antenna being connected to a resonance circuit and the resonance frequency of the RFID antenna being checked. For that purpose the RFID antenna is moved into an electromagnetic field which is tuned to the resonance frequency and which can be provided by a reading device. The RFID antenna can be optically masked in such a way that it is not perceptible when fleetingly viewed.

It is also possible for the security element to have an RFID chip which provides functions for the production of an electronic product code (EPC). The RFID chip can be integrated for example into the layer structure of the second region and can advantageously be in the form of an organic circuit so that it can be easily manufactured as a mass-produced item by printing processes.

It can be provided that both the open information and also the concealed code are read out with the method set forth hereinbefore.

It can further be provided that the open information and/or the concealed code are compared to a data set stored in a database.

Modern cellular phones have incorporated digital cameras with a resolution of some millions of pixels. Such a high level of resolution permits verification of the concealed information by using the cellular phone as an easily accessible reading device, for example for checking the authenticity of a product provided with the security element. For that purpose a photograph of the security element, which is taken with the camera of the cellular telephone, is transmitted to a database server by means of MMS (multimedia messaging service). The database server converts the photograph into an electronic data set and with that data set queries a product database. The result can be communicated to the cellular phone by MMS or SMS (short message service) so that a test result about the authenticity of the product and/or specific items of information which are relevant to observing the gray market or for product tracking and product monitoring is or are available within a short time. In general terms there are different levels of information and security. A security element can have for example besides a TRUSTSEAL® an alphanumeric code which is written in by means of laser ablation and a two-dimensional barcode. Firstly the TRUSTSEAL® which is arranged in the upper portion of the OVD and which specifies for example the product name or the manufacturer is visually verified by the consumer. Secondly the alphanumeric code which gives the serial number can be verified for example by inputting the code into a cellular phone and sending the code in the form of an SMS message to a server and by a reply from the server in the form of an SMS message. Alternatively communication to the server can be afforded by a special reading device or by means of an MMS message which as described above includes a digital photograph of the alphanumeric code. Thirdly the two-dimensional barcode which provides items of information such as serial number, manufacturing date, target market, version number or product specification can be read out on site by the trademark proprietor to obtain product specifications which include more data than the alphanumeric data. Fourthly the security element can contain concealed items of information with a high level of security relevance which require a special reading device or a high-resolution camera which as described above sends the picture in the form of an MMS message to a server for decoding. Those secret items of information would typically include the product name, the place of origin and the target market.

It can further be provided that the open item of information which is visible with a naked eye is an open, optically machine-readable individualized code and the individualized code is stored in the database and the database is queried for verification of the security element. If the individualized code is a barcode it is possible to dispense with digitization of the code. If it is an alphanumeric code it is possible to provide a text recognition method to make the individualized code machine-readable. Advantageously it is possible to provide both the aforementioned code implementations.

It is possible to provide a reading device for reading out the open and concealed items of information from the security element, which comprises at least the following components:

a transparent carrier plate on which the security element can be placed on its front side, a camera which is so arranged and oriented that it produces an image of the front side of the security element which is resting on the transparent carrier plate, a polychromatic non-collimated light source arranged beneath the carrier plate, and a monochromatic coherent or semi-coherent point light source, for example a laser diode or an LED, wherein the point light source is arranged beneath the carrier plate and is so oriented that the optical axis of the point light source impinges at an angle of between 45° and 135°, preferably at an angle of between 85° and 95°, on the region of the carrier plate on which the security element can be placed.

The camera can advantageously be an electronic camera having a sensor chip, wherein the camera can further have a data output for connection to a computer.

It can be provided that the point light source is a laser diode or an LED. It is however also possible for the point light source to be formed from a polychromatic light source which is not point-formed and a slot arranged in front thereof, that is to say a very narrow slot, the light issuing from the slot being passed through a wavelength filter. As such a light source can be very weak in terms of light; in that case a highly sensitive sensor chip can be provided to make the concealed information visible.

BRIEF DESCRIPTION OF THE DRAWINGS

The invention will now be described in greater detail by means of embodiments by way of example. In the drawings.

DETAILED DESCRIPTION OF THE PREFERRED EMBODIMENTS

Figure 1:
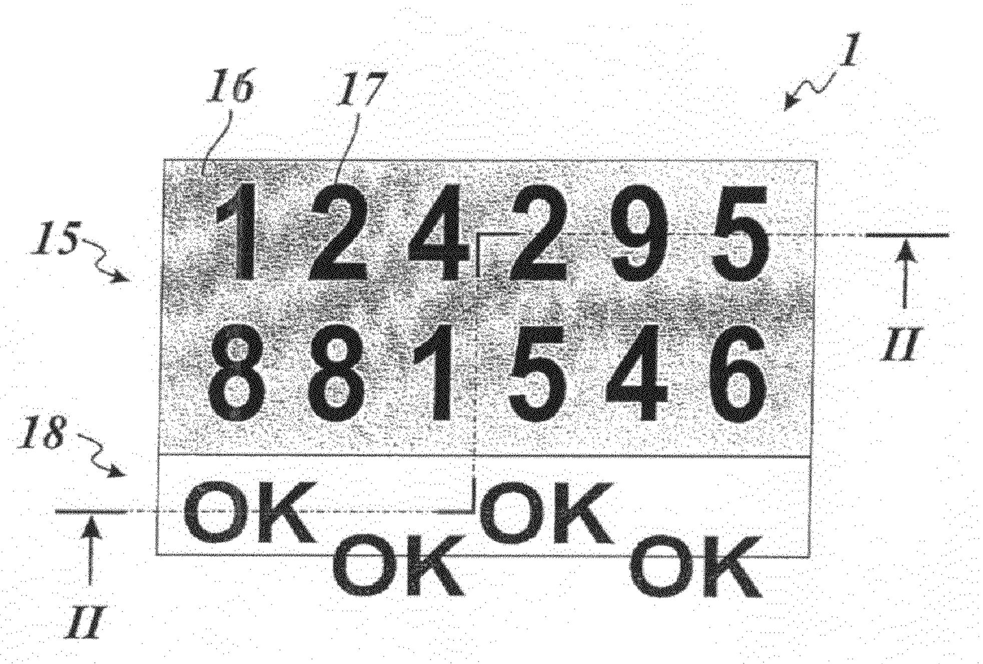
FIG. 1 shows a plan view of a first embodiment of a security element according to the invention.

FIG. 1 shows a security element 1 which in a first region 15 has a computer-generated hologram 16 and alphanumeric characters 17. In the embodiment shown in FIG. 1 the alphanumeric characters 17 are arranged in two lines each with six characters and form a twelve-digit number, that is to say a visible item of information. The visible information shown in the form of an alphanumeric code is readable with the naked eye. Information can be for example an individualized item of information. Instead of the alphanumeric characters it is also possible to provide a barcode, or both the alphanumeric characters and also the barcode can be provided. The barcode can be provided in particular to facilitate machine-reading of the individualized information. The barcode can be either in the form of a one-dimensional barcode or a two-dimensional barcode. The barcode can contain more items of information than are contained in the alphanumeric code or it can provide the same items of information that the alphanumeric code provides.

A concealed item of information is written into the computer-generated hologram 16, wherein the concealed information is not perceptible under illumination with "white" light and when viewed with the naked eye. The concealed information, for example like the above-described visible information, can involve alphanumeric characters and/or a barcode and/or a logo. Typically the computer-generated hologram can include a logo of a very simple nature and/or a number of alphanumeric characters, for example a corporate logo and a country code. The country code can be provided for example for distinguishing target markets involving different price levels. The hologram 16 appears to a viewing person as a matt surface forming a background for the alphanumeric characters 17. The first region 15 therefore forms a diffractive security region which increases the forgery-proof nature of the security element 1 in relation to security elements in which the background region of the individualized information admittedly has diffractive structures which make forgery more difficult, without however concealed information being written thereinto.

Formed in a second region 18 of the security element 1 is tilt image which, at different tilt angles of the security element 1, shows different pictures or images, for example the letter sequence "OK" in different positions and/or colors and/or shapes. Such a security feature can be easily recognized and is striking.

Figure 2:
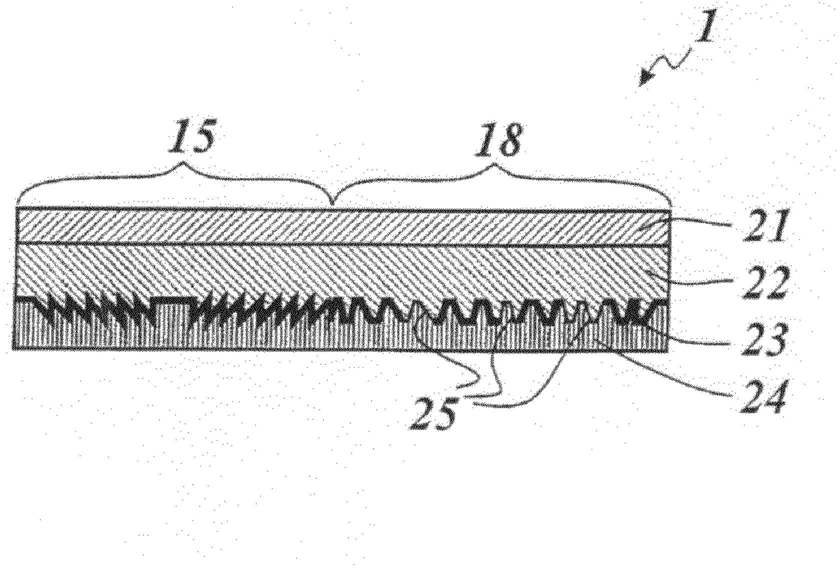
FIG. 2 shows a diagrammatic view in section of the security element of FIG. 1 along line II-II.

FIG. 2 now shows a sectional view, which is not to scale, of the security element 1 taken along section line II-II in FIG. 1.

The security element 1 is in the form of a multi-layer body which as its uppermost layer has a protective layer 21 which covers over a replication layer 22. The replication layer 22 can be of a thickness of between 2 and 20 μm and is formed from a thermoplastic material or a UV-hardenable lacquer. Shaped into the surface of the replication layer 22, that is remote from the protective layer 21, are surface profiles which are covered by a metallic layer 23, acting as a reflection layer. The metallic layer 23 can be applied for example by sputtering or vapor deposition, it can be of a thickness in the range of between 15 and 50 nm and it can comprise aluminum, gold, copper or the like well-reflecting metal or metal alloy. The metallic layer 23 is interrupted in portions 25 for example by laser removal of the metallic layer for the purposes of engraving of the alphanumeric characters 17. Laser ablation is the typical method of inscribing the alphanumeric characters 17. The characters can be inscribed in the manufacturing procedure or also later. If the alphanumeric characters 17 are inscribed in the manufacturing procedure that can be effected completely before the security element or thereafter. The inscription operation can be implemented at any manufacturing step following the metallization operation. At its side remote from the replication layer the metallic layer 23 is covered by an adhesive layer 24. If the inscription operation is effected after application of the adhesive layer 24, the laser power is so selected that only the metallic layer 23 is removed insofar as it is vaporized by the laser beam and accordingly forms small conglomerates at the edges of the exposed regions of the metallic layer 23. In actual fact the alphanumeric characters 17 can also be inscribed by laser ablation after the security element 1 is applied to a product or a document. By way of example the security element 1 can be placed on a visa and the number of the visa can then be inscribed into the security element with a laser.

Instead of the metallic layer 23 it is also possible for example to provide a layer of a material with a high refractive index (HRI layer), a combined HRI-metal layer, a dielectric thin-film layer or a liquid crystal layer.

The adhesive layer 24 can be for example a hot melt adhesive layer so that the security element 1 can be applied to a security document such as an identification card, an identity card or pass or a credit card. The security element shown in FIG. 1 is the transfer layer of a transfer film, in particular a hot embossing film, which further has a carrier layer and an optional release layer between the carrier layer and the protective layer. It is in addition also possible for the security element 1 to be a laminating film which for example instead of the protective layer 21 has a carrier film, for example a PET film which is between 12 and 42 μm in thickness.

Provided in the first region 15 is the surface profile of the replication layer 22 comprising interlinked diffraction gratings whose grating parameters, in particular azimuth angle, spatial frequency and profile shape differ from each other and which deflect the incident light in different directions so that in each case only one of the gratings deflects light into the eye of the viewing person. Because of the wavelength dependency of diffraction, individual light colors can be masked out by selection of the spatial frequency if the security element 1 is illuminated with polychromatic light such as for example daylight. Thus for example red and green images can be produced in succession by tilting the security element 1. It is also possible to use zero-order diffractive structures in which the grating period is below the wavelength of visible light so that polarization of the light which is diffracted back can be influenced by the configuration of the grating.

In the second region 18 the surface profile has a high depth-to-width ratio in respect of the raised portions and recesses. Because of the high depth-to-width ratio which is advantageously selected to be in the range of between 1 and 5, multiple reflections of the incident light occur, the light being scattered in that way and producing the optical impression of a dark matt surface.

The information concealed in the hologram 16 can be rendered visible by coherent monochromatic light, for example by illumination of the hologram with a red laser beam. Because a hologram is distinguished in that interruptions only reduce the resolution of the stored information the holographic image produced by the laser beam is not eclipsed by the alphanumeric characters 17. The concealed information stored in the hologram 16 can preferably involve alphanumeric characters and/or a barcode. It is however also possible for it to be a graphic object or the like such as for example a corporate logo. Simple geometrical objects such as circles or triangles can also be provided for improved machine identification.

Figure 3:
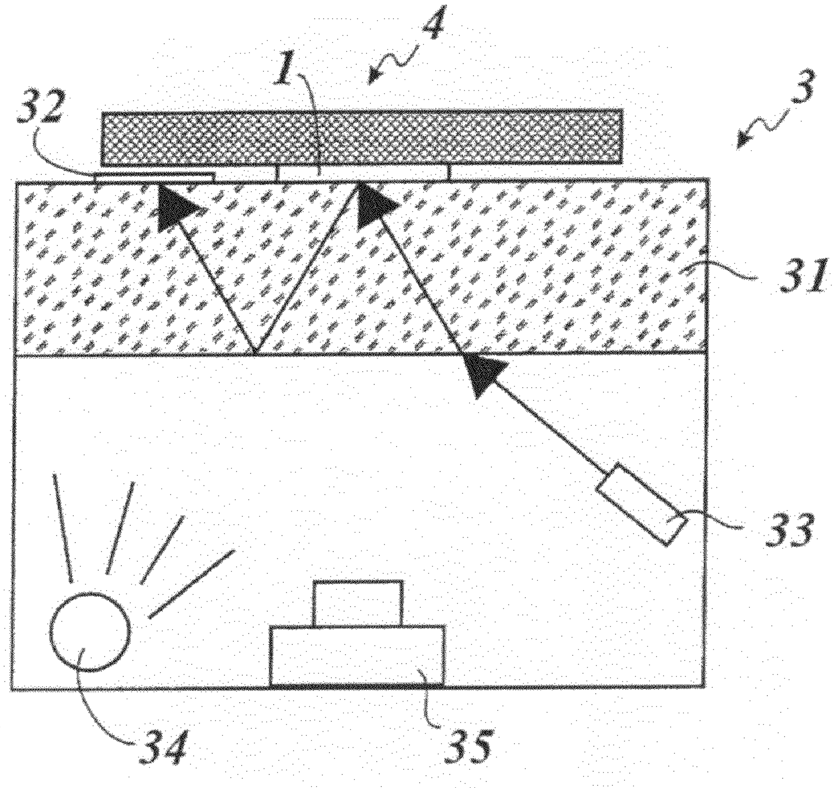
FIG. 3 shows a first embodiment of a reading device for the security element of FIG. 1.

FIG. 3 now shows a reading device 3 for reading out the items of information stored in the security element. The security element 1 is applied to a security document 4, as described hereinbefore. At its top side the reading device 3 carries a thick glass plate 31, on the top side of which is arranged a projection screen 32. The projection screen 32 is colored white on its underside that is towards the top side of the glass plate 31. It can also be provided that the projection screen 32 is formed by a white color printing thereon or by a matt glass region introduced into the surface of the glass plate 3.

In addition a laser 33 is so arranged in the reading device 3 that the coherent light beam issuing from the laser 33 is incident inclinedly on the underside of the glass plate 31, it is refracted in the glass plate 31 towards the perpendicular axis of incidence, reflected at the hologram 16 arranged in the first region 15 (see FIGS. 1 and 2) of the security element 1, reflected at the underside of the glass plate 31 and is then incident on the projection screen 32 where it represents the information concealed in the hologram 16. It can advantageously be provided that the image beam impinges with total reflection on the projection screen 32, for which purpose for example a special coupling-in structure can be provided for coupling the light beam into the glass plate 31.

In addition arranged in the reading device 3 is a polychromatic or white light source which illuminates the security element 1 whereby the alphanumeric characters 17 which are inscribed in the first region are visible.

A camera 35 is provided for evaluation of the information represented on the projection screen 32 and on the first region 15 of the security element 1. The camera 35 can advantageously be what is referred to as a digital camera with a digital image sensor having a signal output for connection to a signal port of a computer. In that way, in the simplest case, the image received by the camera 35 can be represented and manually evaluated on a computer monitor. It is advantageous if the two-dimensional image sensor simultaneously produces the image of the projection screen 32 and also the alphanumeric characters 17 on the security element 1 (see FIG. 1).

Figure 4:
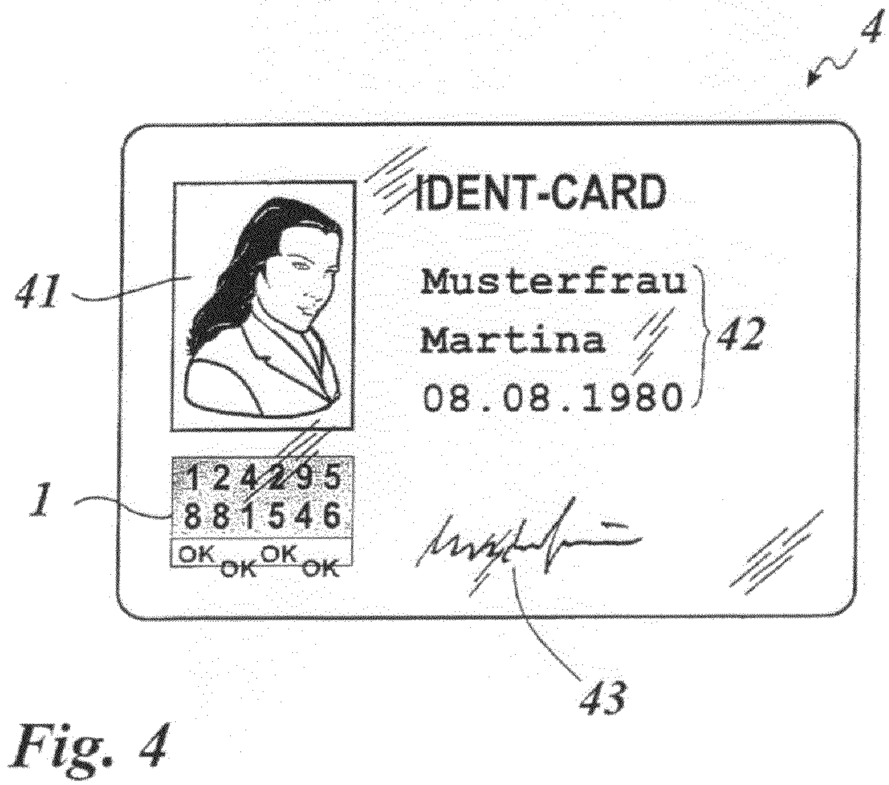
FIG. 4 shows a first embodiment of a security document with the security element of FIG. 1.

FIG. 4 now shows a plan view of the security document 4 of FIG. 3. The security document 4 shown in FIG. 4 is an identification card which, besides the security element 1, has a pass picture 41 of the female holder, readable individualized data 42 (name, forename, date of birth) of the holder and the holder's signature 43.

The items of information stored in the security element 4 can be stored in a database which is queried when checking the security document 4.

Figure 5:
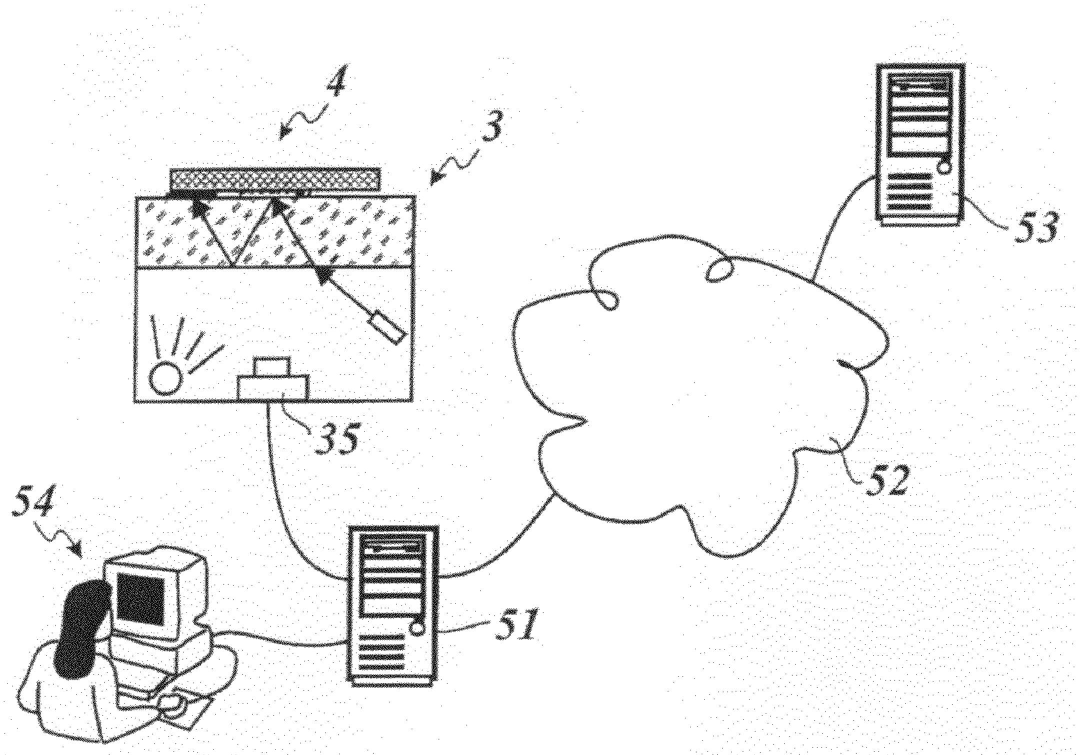
FIG. 5 shows an arrangement for verification of the security document of FIG. 4.

FIG. 5 shows by way of example a device suitable for the above-mentioned checking operation. The camera 35 of the reading device 3 is connected to a local computer 51 equipped with text recognition software. Text recognition software is also known as OCR software.

The computer 51 is connected to a database server 53 by way of a network 52 which in the embodiment shown in FIG. 5 is the Internet. The data required for verification of the information stored in the security element 1 are stored in a database set up on the database server 53. It is advantageously provided that a secure connection, for example an encrypted connection, is formed between the computer 51 and the database server 53. The computer 51 is connected to a computer workstation 54, by way of which control of the reading device 3 and operation of the computer 51 is possible.

Figure 6:
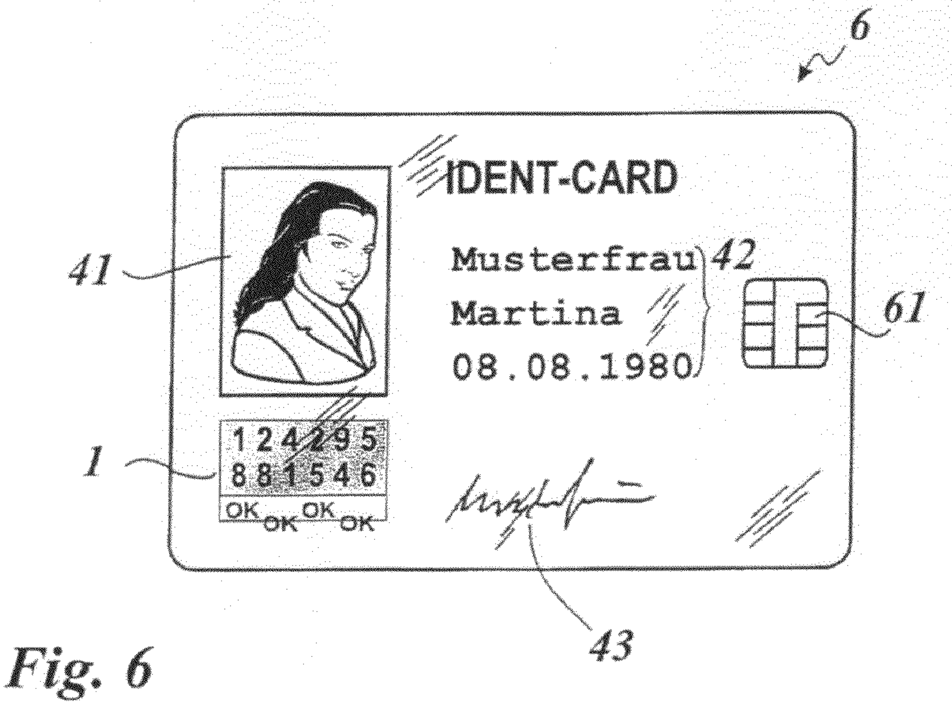
FIG. 6 shows a second embodiment of a security document with the security element of FIG. 1.

FIG. 6 now shows a security document 6 which is like the security document 4 shown in FIG. 4 but which in addition to the security element 1, the pass picture 41, the readable individualized data 42 and the signature 43, has a memory chip 61 in which data for verification of the security document 6 or the female holder of the security document can be stored, for example the holder's biometric data. Instead of the memory chip 61 it is also possible to provide an RFID tag (unit for radio frequency identification) which can have the advantage over the memory chip 61 that it can be wirelessly queried.

Figure 7:
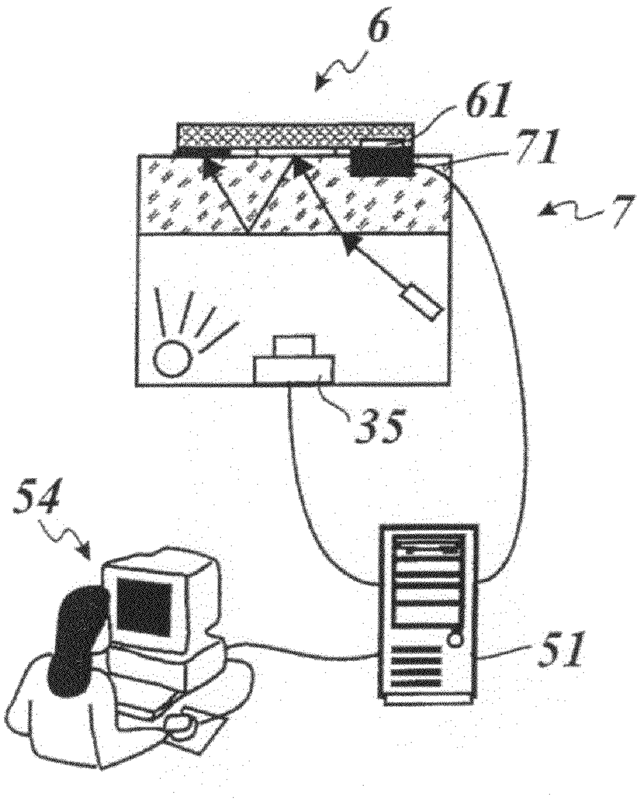
FIG. 7 shows an arrangement for verification of the security document of FIG. 5.

FIG. 7 now shows a reading device 7 which differs from the reading device 3 shown in FIGS. 3 and 5 in that it additionally has a chip reading device 71 for reading out the information stored in the memory chip 61 of the security document 6. Both the chip reading device 71 and also the camera 35 are connected to the computer 51 which, as described hereinbefore, is connected to the computer workstation 54.

Figure 8:
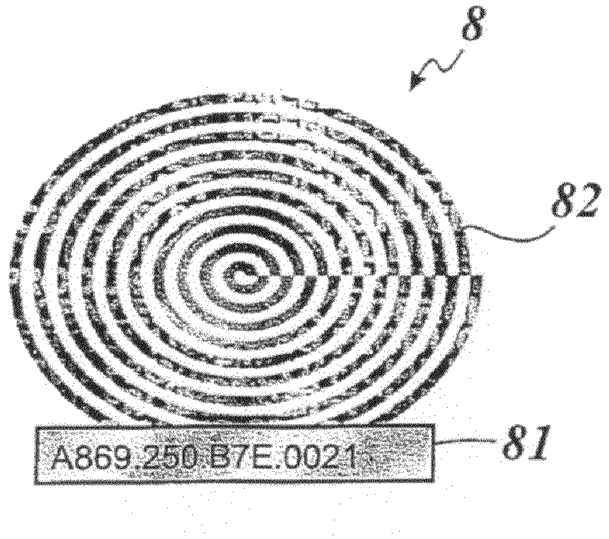
FIG. 8 shows a plan view of a second embodiment of a security element according to the invention.

FIG. 8 now shows a security element 8 having a first region 81 which is in the form of a diffractive security region, that is to say a security region with a diffractive surface relief, and a second region 82 which is in the form of an OVD, the contour of which is shaped as an RFID antenna for an RFID tag. The RFID antenna can be detected by a reading device which ascertains the resonance frequency of the RFID antenna, as described hereinafter. An RFID chip is not required in this embodiment.

The first region 81 is like the region 15 in FIG. 1, that is to say it provides both an item of open information and also an item of concealed information which can be read out by a reading device.

Figure 9:
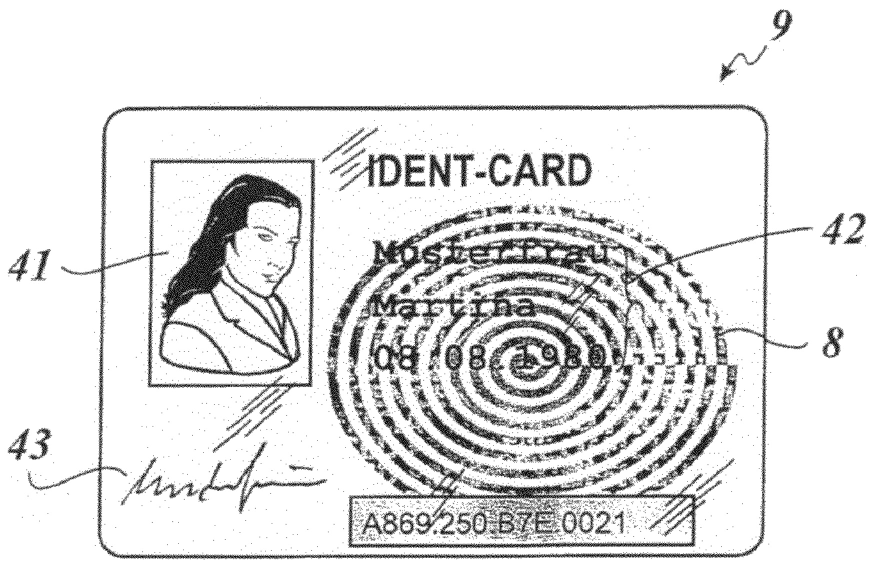
FIG. 9 shows an embodiment of a security document with the security element of FIG. 7.

FIG. 9 now shows a security document 9 which differs from the security document shown in FIG. 4 essentially by the nature of the security element. The security document 9 is an identification card which, besides the picture 41 of the female holder, the readable individualized data 42 (name, forename, date of birth) of the holder and the holder's signature 43 has the security element 8 of FIG. 8.

Figure 10:
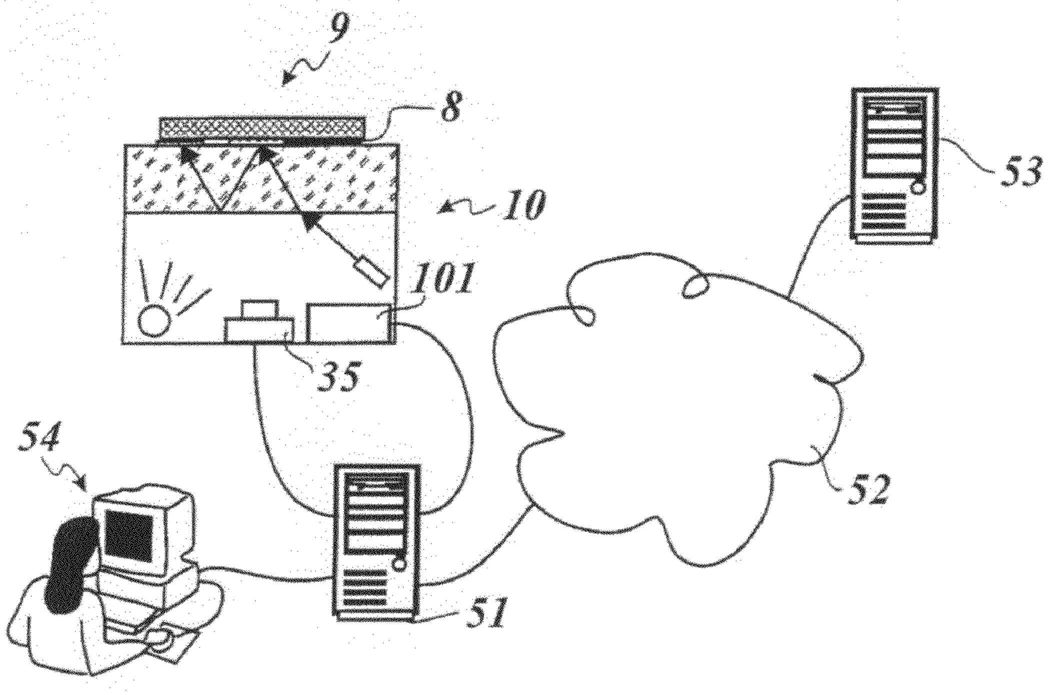
FIG. 10 shows an arrangement for verification of the security document of FIG. 8.

FIG. 10 shows a reading device 10 differing from the reading device 3 shown in FIGS. 3 and 5 in that it additionally has an RFID reading device 101 for determining the resonance frequency of the RFID antenna of the security element 8. If the RFID antenna of the security element 8 is not of the reference frequency the security document 9 is not accepted.

Both the RFID reading device 101 and also the camera 35 are connected to the computer 51 which, as described hereinbefore with reference to FIG. 5, is connected to the database server 53 by way of the network 52. In addition the computer workstation 54 is provided for the input and output of data, for example for triggering the reading operation, for the database query procedure or the like. The network 52 can be for example the Internet as described hereinbefore or a corporate network, in which respect the term "corporate network" is also used to denote the network of an authority or administration.

Figure 11:
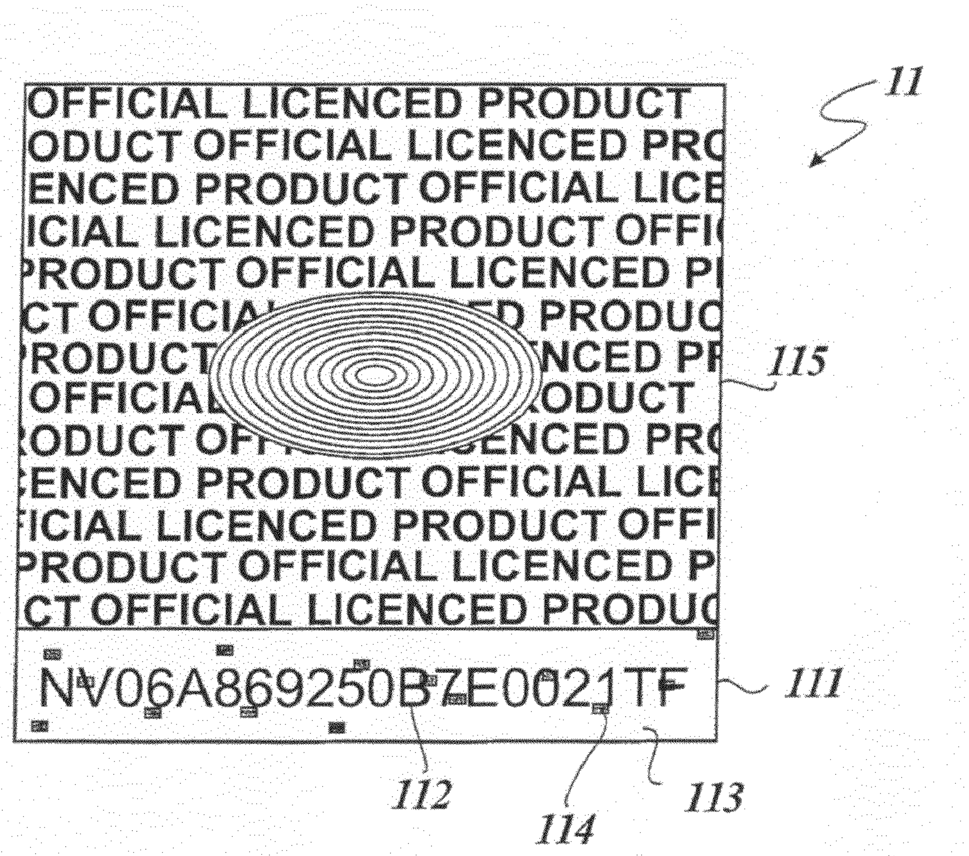
FIG. 11 shows a diagrammatic plan view of a third embodiment of a security element according to the invention.

FIG. 11 now shows a third embodiment of a security element according to the invention. A security element 11 has a first region 111 which is a diffractive security region and a second region 115 in the form of an OVD. The second region 115 is provided in the FIG. 11 embodiment in order to indicate in a form which is easy to remember and effective in terms of advertising that the product marked with the security element 11 is an original product. The second region 115, for example besides the indication that this is an original product, can have a corporate logo and a product identification. In accordance with the many different configurational options afforded by an OVD, for example upon tilting of the security element color effects, different pictures or images or different picture or image sizes as well as motion effects can be shown.

The first region 111 has a background 113 with a diffractive surface relief into which alphanumeric characters 112 providing open information are introduced. This preferably involves an individualized item of information which is allocated only once, for example to permit product tracking by the consumer by way of retailers and wholesalers to the manufacturer. The background 113 can be for example a cross grating, a matt structure or the like.

Provided in the background 113 are microregions 114 with a diffractive surface relief, which are not perceptible with a naked eye. These can be for example reflecting microregions measuring 10 μm×10 μm.

The view in FIG. 11 shows the microregions 114 on a very greatly magnified scale. In a basic version for example there can be 4096 pixels in a surface area measuring 50 mm×50 mm to store 2 characters or 4096 ID-numbers. An enlarged version can store 10 characters or ID-numbers of between 1 and 4 billions. In a further version up to 1 billion codes can be stored in an area measuring 17 mm×17 mm.

Good contrast between the microregions 114 and the background 113 can be advantageous for being reliably able to read out the concealed information.

In a first advantageous embodiment reflecting microregions 114 are arranged on a background 113 with an isotropic matt structure.

In a second advantageous embodiment reflecting microregions 114 are arranged on a background which is in the form of an isotropic matt structure combined with a cross grating involving a spatial frequency of 1050 lines/mm.

It can further be provided that the concealed information is encrypted so that reading out the information additionally requires a key which is only known to the manufacturer or the possessor of the product.

Modern cellular phones have incorporated digital cameras with a resolution of some millions of pixels. Such a high level of resolution permits verification of the concealed information by a photograph which is taken for example by a consumer, vendor or a supervisory organization with the camera of the cellular phone, and the photograph can be sent to a database server by means of MMS. The database server can convert the photograph into an electronic data set and compare it to a product database. The result can be sent to the cellular telephone by MMS or SMS so that a checking result about the authenticity of the product and/or specific items of product information which are relevant for observing the gray market or for product tracking and product monitoring is or are available within a short time.

At the same time the camera of the cellular telephone produces an image of the alphanumeric characters 112 and the microregions 114, wherein the alphanumeric characters 112 can give individual items of information about the product or document and the microregions 114 can give items of information about the class of product or document.

Figure 12A:
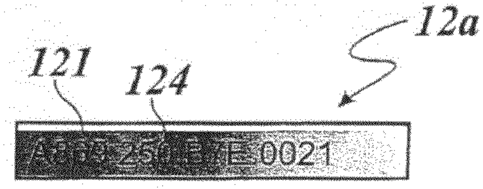
FIGS. 12*a* through 12*c* show further embodiments of a security element according to the invention.
Figure 12B:
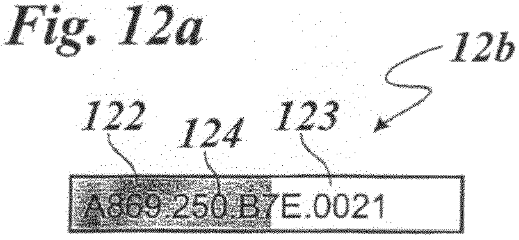
Figure 12C:
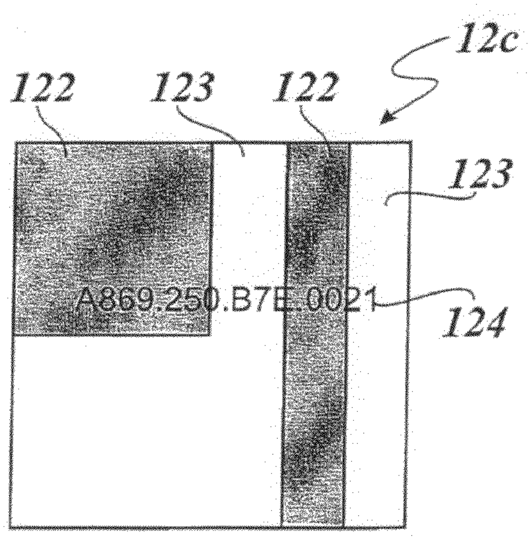

FIGS. 12*a* through 12*c* show security elements 12*a* through 12*c*, which differ in respect of the nature of the background. The security elements 12*a* through 12*c* have alphanumeric characters 124 which are produced in the background region 121 by laser ablation. The background region 121 is removed in the region of the alphanumeric characters 124.

The background region 121 has a continuously variable optical effect, for example a brightness pattern with continuously falling or rising gray values. In the embodiment shown in FIG. 12*a* the brightness pattern is in the longitudinal direction of the security element 12*a*, that is to say parallel to the arrangement of the alphanumeric characters 124.

The security element 12*b* in FIG. 12*b* has a background region formed from two mutually juxtaposed background regions 122 and 123. The background regions 122 and 123 form a one-dimensional pattern. The background regions 122 and 123 have surface reliefs with different diffractive structures which differ from each other in at least one parameter. By way of example the background regions 122 and 123 can differ in respect of:

polarization property
grating period
grating orientation
grating shape
grating depth
grating profile shape
configuration of the diffractive surface relief It can be provided that the optical impression of the two background regions is the same so that it is not possible to distinguish the differing configuration of the background regions when viewing with the naked eye. It can further be provided that more than two different background regions form the background of the security element 12*b*. With a sufficiently fine subdivision the security element 12*b* can afford the optical impression of the security element 12*a* (FIG. 12*a*).

FIG. 12*c* now shows the security element 12*c* which has a background with a two-dimensional pattern. In the FIG. 12*c* embodiment the security element 12*c* is in the form of a square security element with the two background regions 122 and 123. The background region 122 forms a square arranged in the top left corner of the square background, with half the edge length of the background and a perpendicularly arranged strip which is spaced therefrom and which extends from the upper edge of the background to the lower edge.

The concealed information can advantageously be written into the security elements 12*a* through 12*c* similarly to the FIG. 11 embodiment. It is however also possible for one or more of the background regions 121 through 123 to be in the form of a computer-generated hologram as described hereinbefore with reference to FIG. 1.

The properties of the light source of the reading device can be controlled and varied for an authenticity check. For example it is possible to provide two light sources, wherein the polarization of the light sources is different, or the position and thus the angle of incidence of the light sources is different, or the wavelength of the light sources is different.

It is possible to check the authenticity of the security element by the production of two images which are each recorded with a respective one of the two light sources.

Figure 13:
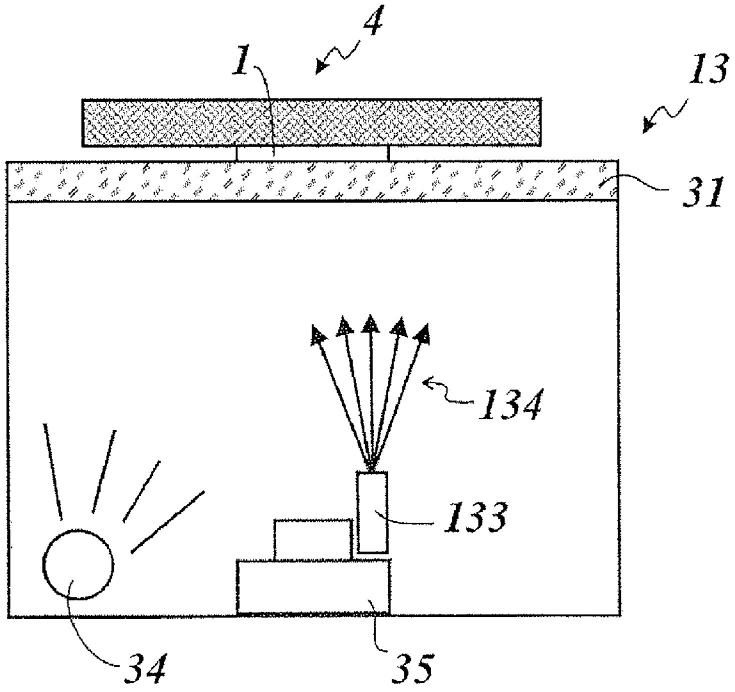
FIG. 13 shows a second embodiment of a reading device for the security element of FIG. 1.

FIG. 13 shows a second embodiment of a reading device for reading out the items of information stored in the security element 1 of FIG. 1. The security element 1 is applied to a security document 4, as described hereinbefore.

A reading device 13 is designed like the reading device 3 described hereinbefore with reference to FIG. 3, with the difference that the glass plate 31 on which the security document 4 can be placed is a thin glass plate and no projection screen is arranged on the top side of the glass plate 31. In addition the reading device 13 does not have a laser for producing a coherent light beam but a monochromatic coherent point light source 133 which emits a beam 134 for illuminating the security element 1. The point light source 133 is arranged parallel to the optical axis of the camera 35, the spacing of the point light source 133 relative to the optical axis of the camera 35 being selected to be as short as possible. Ideally the axis of the beam of the point light source 133 coincides with the optical axis of the camera 35. The optical axis of the point light source 133 is incident on the region of the glass plate 31, in which the security element 1 can be placed, at an angle of between 45° and 135°, preferably at an angle of between 85° and 95°.

The point light source 133 used can be for example a laser diode or an LED which emits monochromatic coherent light. In physics coherence denotes a property of waves which permits interference phenomena which are invariable in respect of time and space. If non-coherent light is passed through a very narrow gap the light emerging behaves as if the gap is a point light source which emits coherent light. In that situation, spatial coherence increases with increasing distance relative to the light source. Coherence in respect of time can be increased by a wavelength filter. The coherent beam 134 which impinges on the security element 1 now makes the information concealed in the security element 1 visible, wherein some substantial improvements over the reading device 3 described with reference to FIG. 3 are achieved by replacing the laser 33 with the point light source 133:

reduction in costs, simple and compact structure for the reading device; and a high degree of insensitivity in relation to positional tolerances of the regions of the security element 1, that contain the concealed information.

A comparable increase in insensitivity in relation to positional tolerances could be achieved only by the use of more than one laser 33 in FIG. 3 or by an additional device for line-wise deflection of the laser beam.

The point light source 133 admittedly has a coherence which is reduced in relation to the laser 33, but it has been found that a high level of coherence is not necessary although visibility of the concealed information increases with higher coherence. The concealed information is typically represented with a rainbow effect when using the point light source 133 for illumination purposes.

The point light source 133 used was for example a laser diode of 1 mW power and a wavelength of 635 nm without a collimation optical system. The beam 134 emitted by the laser diode had a spread angle of 34°. An LED was also used as the point light source 133.

The polychromatic or white light source 34 arranged in the reading device 13 can be of the structure as described hereinbefore with reference to FIG. 3. It is in the form of wide-band non-collimated light source and can also be formed for example by a larger number of white or colored LEDs or an electroluminescence plate.

The invention claimed is:

1. A security element for increasing the forgery-proof nature of a security document, wherein the security element has a first region comprising a background region and an arrangement of a plurality of microregions separated by the background region, and wherein the background region has a diffractive surface relief shaped at least region-wise in a layer of the security element, the diffractive surface relief being provided at least region-wise with a reflection layer, and wherein the first region shows an open item of information against a surrounding region, the open item of information being visible with a naked eye and, wherein the arrangement of the plurality of microregions form a concealed code which is not visible with the naked eye and which can be read out optically and which is machine-readable, the arrangement of microregions differing optically from the surrounding region and having a surface relief differing from the surrounding region shaped therein and/or having the reflection layer removed therefrom and/or having the machine-readable code generated by a surface relief shaped therein.

2. A security element as set forth in claim 1, wherein the concealed code is a code which is individualized by a laser.

3. A security element as set forth in claim 1, wherein the surface area occupied by the microregions in the first region is constant in relation to each surface area region of 300 μm×300 μm.

4. A security element as set forth in claim 1, wherein the microregions are of a surface area extent in the range of between 10 μm×10 μm and 30 μm×30 μm.

5. A security element as set forth in claim 1, wherein there are between 100 and 1000 microregions/$mm^2$ in the first region.

6. A security element as set forth in claim 1, wherein the concealed code is determined by the arrangement of the microregions.

7. A security element as set forth in claim 1, wherein a hologram is shaped into the layer in the first region in the form of a surface relief, showing the concealed machine-readable code only upon irradiation with monochromatic coherent light of a predefined wavelength.

8. A security element as set forth in claim 7, wherein the hologram appears as a matte structure upon illumination with polychromatic light.

9. A security element as set forth in claim 1, wherein two or more diffractive structures are shaped as the surface relief into the layer in the first region.

10. A security element as set forth in claim 1, wherein the open code is introduced into the first region by a laser engraving operation by the reflection layer being removed in the region of the code.

11. A method of increasing the forgery-proof nature of a security document, in particular an identity card, a passport or an identification card, the method comprising the steps of:

providing the security document with a security element which has a first region comprising a background region and a plurality of microregions separated by the background region;

providing the background region with a diffractive surface relief shaped at least region-wise into a layer of the security element;

providing the diffractive surface relief at least region-wise with a reflection layer;

introducing an open item of information against a surrounding region within the first region, the open item of information being visible with a naked eye;

arranging the plurality of microregions to form a concealed code which is not visible with the naked eye and which can be optically read out and which is machine-readable, the arrangement of microregions differing optically from the surrounding region and having a surface relief differing from the surrounding region and/or having the reflection layer removed and/or having the machine-readable code generated by a surface relief shaped therein; and reading the concealed machine-readable code with a reading device for verification of the security element.

12. A method as set forth in claim 11, wherein the open information is also read out by the reading device, wherein the open information which is visible with a naked eye is an open, optically machine-readable individualized code.

13. A method as set forth in claim 11, wherein the open information and/or the concealed code are compared to a data set stored in a database.

14. A method as set forth in claim 13, wherein the open code and/or the concealed code is generated upon individualization of the security element as an individualized code, and is written into the first region of the security element, and the individualized code is stored in the database and the database is queried for verification of the security element.

15. A reading device for carrying out the method as set forth in claim 11, wherein the reading device comprises at least the following components:

a transparent carrier plate on which the security element can be placed on its front side, a camera which is so arranged and oriented that it produces an image of the front side of the security element which is resting on the transparent carrier plate, a polychromatic non-collimated light source arranged beneath the carrier plate, and a monochromatic coherent or semi-coherent point light source, wherein the point light source is arranged beneath the carrier plate and is so oriented that the optical axis of the point light source impinges at an angle of between 45° and 135°, on the region of the carrier plate on which the security element can be placed.

* * * * *